April 23, 1929.  G. W. SMIDLEY  1,710,118
SANITARY HOG HOUSE
Filed Aug. 27, 1927  2 Sheets-Sheet 1
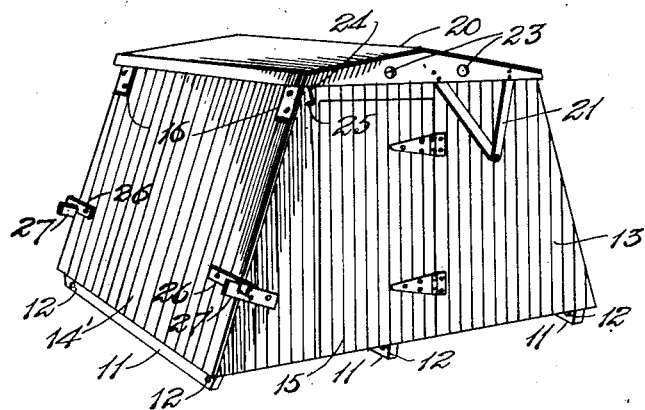
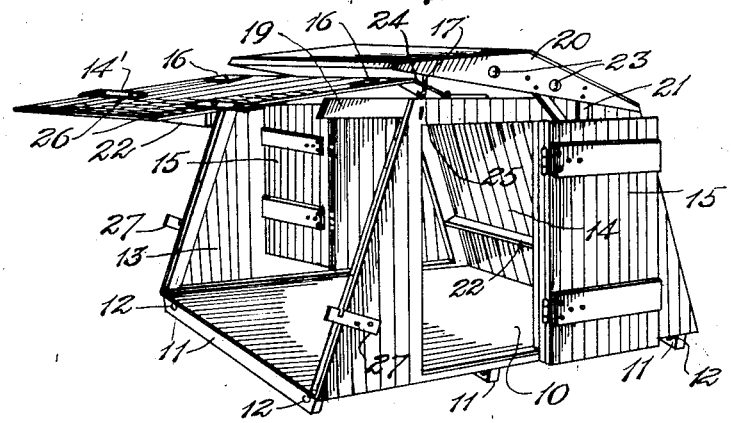
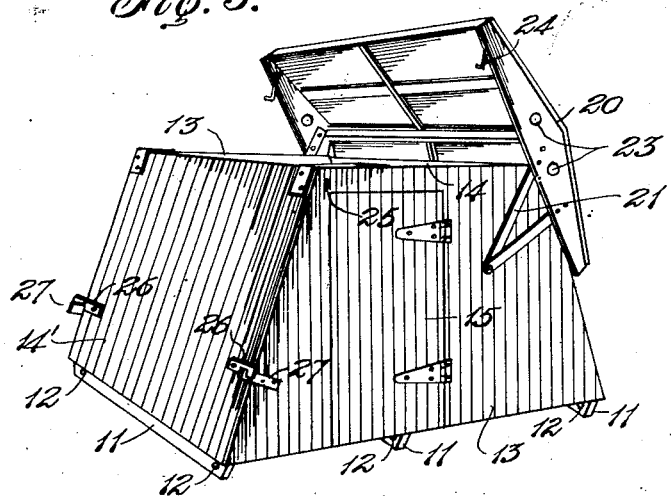
INVENTOR.
George W. Smidley,
BY Horace C. Chandler
ATTORNEYS.

April 23, 1929.  G. W. SMIDLEY  1,710,118
SANITARY HOG HOUSE
Filed Aug. 27, 1927  2 Sheets-Sheet 2
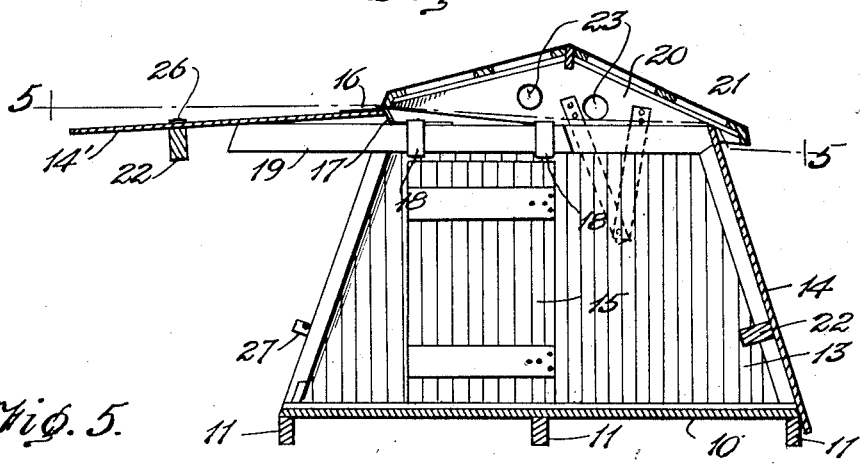
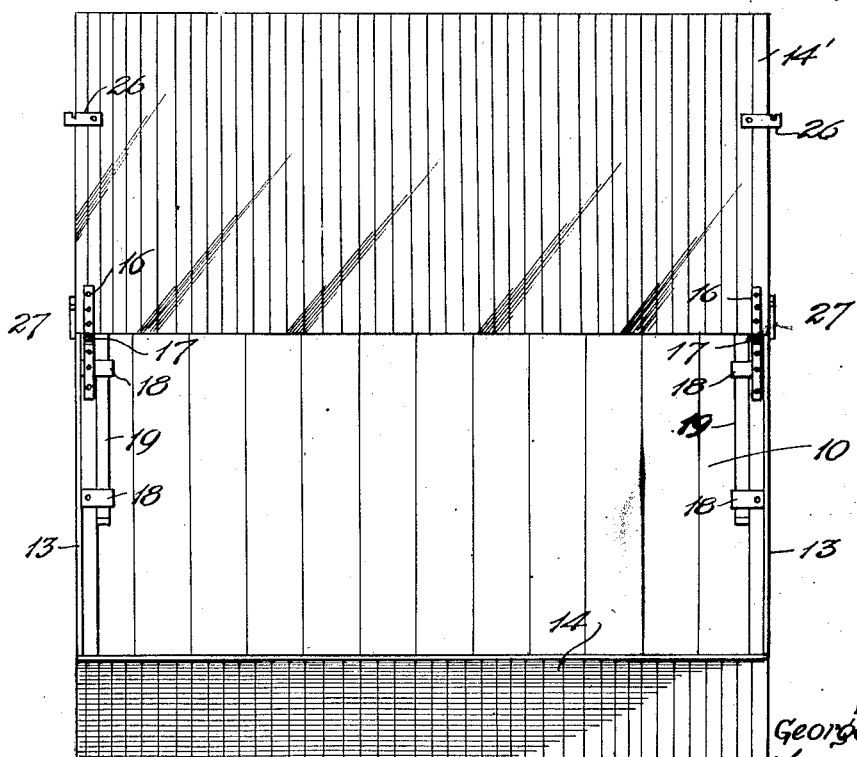
INVENTOR.
George W. Smidley,
BY
ATTORNEYS.

Patented Apr. 23, 1929.

1,710,118

UNITED STATES PATENT OFFICE.

GEORGE W. SMIDLEY, OF NEW HOLLAND, OHIO.

SANITARY HOG HOUSE.

Application filed August 27, 1927. Serial No. 215,908.

This invention relates to new and useful improvements in houses, and particularly to houses adapted for use by various live stock, poultry, and the like.

One object of the invention is to provide a house of this character which is simple in construction, and which can be manufactured at a comparatively low cost.

Another object is to provide a house of this character which is especially adapted for use in farrowing of swine, and which may be readily moved from place to place.

Another object is to provide a house of this character which is provided with a movable side wall adapted to be raised and held in such position, to provide a shade producing canopy for the swine.

Another object is to provide a house of this character which is clean and sanitary, and which provides ample space for the sow and the smaller pigs.

Another object resides in the provision of novel means for supporting the movable side in elevated position, and which is capable of being moved into the house when the side is to be lowered.

Another object is to provide a house of this character which is provided with a movable roof, such roof being so arranged that when the movable side is in elevated position, said roof will be slightly elevated, thus providing for efficient ventilation and sterilization by sunlight.

Other objects and advantages will be apparent from the following description when taken in connection with the accompanying drawings.

In the drawings:

Figure 1 is a perspective view of a house made in accordance with the present invention, the roof and movable side wall being in closed position, as well as the end doors.

Figure 2 is a perspective view of the house, showing the roof closed, the movable side raised, and the end doors open.

Figure 3 is a perspective view of the house, the roof being shown in raised position, and the end doors closed, while the movable side wall is in lowered position.

Figure 4 is a vertical transverse sectional view through the house, showing the movable side wall in elevated position.

Figure 5 is a horizontal sectional view on the line 5—5 of Figure 4.

Referring particularly to the accompanying drawing, there is shown a house which includes the bottom or floor 10, supported on the runners 11, each of the latter of which being provided with openings 12, for the reception of suitable draft means, for moving the house from place to place. The end walls 13, of the house are vertical, while the side walls 14 are inclined upwardly and inwardly, as clearly seen in Figures 1 and 2, of the drawing. In each of the end walls of the house there is mounted a door 15, by means of which the animals may enter and leave the house. One of the side walls, which is designated 14', to distinguish the same from the other side wall, is adapted to be swung upwardly, and is connected to the upper portion of the house by means of the hinges 16. The leaf of each hinge, which is attached to the movable wall 14' is offset, as shown at 17, whereby to permit the said side to close in tightly against the adjacent edges of the end walls of the house. Mounted on the upper portions of the inner faces of the end walls 13 are the guide loops 18, there being a longitudinally alined pair on each wall, as shown. Slidable in each pair of loops is a bar 19 which is adapted to be moved outwardly through the open side of the house, beneath the raised side wall 14', for the purpose of holding said wall in elevated position.

An oppositely sloping roof 20 is disposed in covering relation to the upper end of the house, and such roof is attached to the end walls by means of the hinges 21, whereby said roof is capable of being swung upwardly and laterally, to lie in an inclined position against the other side of said house. This permits free access to the interior of the house for the purpose of cleaning the same, and for feeding the occupants. Also, when the house is used for storing grain, feed, or the like, such material may be readily placed therein, or be removed therefrom. Secured to each of the inclined sides of the house, and extending longitudinally thereof, is a bar or rail 22, which is arranged at a suitable height from the floor, whereby to prevent the sow from lying too close to said side, and injuring the smaller pigs. This provides a space between the sow and the wall for the smaller pigs to pass. In the end walls of the roof there are provided the ventilating openings 23.

When the roof is in lowered, or closed position, the doors 15 closed, and the side wall 14' in lowered position, the house provides for snug winter quarters for the hogs, whether small or grown. In the warmer weather the side 14' is raised, and held in such position by sliding the bar 19 outwardly through the loops 18, while at the same time, the roof is elevated, and held by the inner portion of the elevated side wall, as clearly seen in the drawings. If desired the doors 15 may also be opened, thus providing for the free entrance of air, and also of sunshine, which are both greatly beneficial to the hogs. The elevated side 14' also serves as a shade under which the hogs may lie, especially when the house is out in a field where no shade trees are present. Each end of the roof, adjacent the side wall 14', is provided with a hook 24, which is adapted to engage with a loop or eye 25, on the end wall of the house, for the purpose of maintaining said roof in closed position. Pivotally mounted on the movable side adjacent each end thereof, is a latch bar 26, which is adapted to engage with a stationary notched bar secured to the end wall of the house, as shown at 27, for the purpose of maintaining said wall 14' in closed, or lowered position. When it is desired that more light and air enter the house, the roof may be swung upwardly and laterally, until it stands in an inclined position against the outer face of the side wall 14.

What is claimed is:

1. A hog house comprising an enclosure including side walls and end walls, one of the side walls being movably connected with the end walls for upward swinging movement to uncover one side of the house, means for supporting said side wall in elevated position, and a roof movably connected with opposite walls of the house and adapted to cover and uncover the upper portion of the house, the connected end of said movable side being arranged to support one side of the roof above the house, whereby to provide for ventilation.

2. A hog house including a floor, perpendicular end walls, sloping side walls, one of said side walls being fixed, the other side wall being movably connected with the end walls for upward swinging movement into horizontal position whereby to uncover one side of the house, means for holding said side wall in elevated position, means for holding said side wall in lowered side closing position, access openings in the end walls, and a roof connected with the end walls and arranged to swing into covering position with relation to the house, at times, and to lie against the fixed sloping side of the house, at times.

In testimony whereof, I affix my signature.

GEORGE W. SMIDLEY.